United States Patent
Sensharma (10) Patent No.: US 10,078,683 B2
(45) Date of Patent: Sep. 18, 2018

(54) BIG DATA CENTRALIZED INTELLIGENCE SYSTEM

(71) Applicant: JPMorgan Chase Bank, N.A., New York, NY (US)

(72) Inventor: Prithviraj Sensharma, Kolkata (IN)

(73) Assignee: JPMorgan Chase Bank, N.A., New York, NY (US)

( * ) Notice: Subject to any disclaimer, the term of this patent is extended or adjusted under 35 U.S.C. 154(b) by 360 days.

(21) Appl. No.: 13/933,819

(22) Filed: Jul. 2, 2013

(65) Prior Publication Data

US 2015/0012502 A1     Jan. 8, 2015

(51) Int. Cl.
*G06F 17/30* (2006.01)

(52) U.S. Cl.
CPC .............................. *G06F 17/30592* (2013.01)

(58) Field of Classification Search
None
See application file for complete search history.

(56) References Cited

U.S. PATENT DOCUMENTS

| | | | |
|---|---|---|---|
| 8,264,702 | B2 | 9/2012 | St. Jacques, Jr. et al. |
| 8,326,669 | B2 | 12/2012 | Korupolu et al. |
| 8,359,223 | B2 | 1/2013 | Chi et al. |
| 8,370,307 | B2 | 2/2013 | Wolfe |
| 8,452,792 | B2 | 5/2013 | Barga |
| 2004/0256718 | A1* | 12/2004 | Chandler ............... G06Q 10/10 257/704 |
| 2006/0015529 | A1 | 1/2006 | Yagawa |
| 2007/0061373 | A1 | 3/2007 | Kilday |
| 2008/0109343 | A1 | 5/2008 | Barclay et al. |

(Continued)

FOREIGN PATENT DOCUMENTS

| | | |
|---|---|---|
| EP | 2596430 | 5/2013 |
| WO | WO1999055050 A1 | 10/1999 |

(Continued)

OTHER PUBLICATIONS

Sean Kimball, James Luisi, Big Data and Data Administration: Data Modeling in the World of BigData; http://www.tdan.com/view-articles/16837; Feb. 1, 2013.

(Continued)

*Primary Examiner* — Mark D Featherstone
*Assistant Examiner* — Navneet Gmahl
(74) *Attorney, Agent, or Firm* — Hunton Andrews Kurth LLP (57) ABSTRACT

Embodiments of the present invention are directed to a system and method for a central intelligence system for managing, analyzing, and maintaining large scale, connected information systems. The centralized information system may receive data from servers, databases, mainframes, processes, and other technological assets. A user is able to use the centralized information system to run analysis on the data associated with the connected systems, including: historical analysis, real-time analysis, and predictive modeling. The system can monitor the data and automatically correct identified errors without the need of human intervention. The centralized information system can also generate risk management profiles and automatically modify data to conform to the risk management profiles.

18 Claims, 8 Drawing Sheets

(56) References Cited

U.S. PATENT DOCUMENTS

| | | | |
|---|---|---|---|
| 2008/0229025 A1 | 9/2008 | Plamondon | |
| 2009/0150213 A1* | 6/2009 | Cyr | G06Q 30/0202 705/7.31 |
| 2011/0161293 A1 | 6/2011 | Vermeulen et al. | |
| 2011/0264805 A1* | 10/2011 | Breitgand | G06F 9/45558 709/226 |
| 2012/0124197 A1* | 5/2012 | Ghai | H04L 43/12 709/224 |
| 2012/0317155 A1 | 12/2012 | Ogasawara | |
| 2013/0124483 A1 | 5/2013 | Furuhashi | |
| 2013/0151453 A1 | 6/2013 | Bhanot et al. | |
| 2013/0152215 A1 | 6/2013 | Khosravy et al. | |
| 2014/0067408 A1* | 3/2014 | Aach | G06Q 50/22 705/2 |
| 2014/0074762 A1* | 3/2014 | Campbell | G06Q 40/00 706/46 |
| 2014/0222521 A1* | 8/2014 | Chait | G06Q 10/0637 705/7.36 |

FOREIGN PATENT DOCUMENTS

| | | |
|---|---|---|
| WO | WO2008070484 | 6/2008 |
| WO | WO2013052692 | 4/2013 |

OTHER PUBLICATIONS

A. Fox and et al., Above the Clouds: A Berkeley View of Cloud Computing, EECS Dept. Univ of California, Berkeley, Technical Report, EECS-2009-28, Feb. 2009.

Y. Lee, W. Kang, and H. Son, An Internet Flow Analysis Method with MapReduce, 1st IFIP/IEEE Workshop on Cloud Management, Apr. 2010.

Wang, J., Crawl, D., and Altintas, I. 2009. Kepler + Hadoop: a general architecture facilitating data-intensive applications in scientific workflow systems. In *Proceedings of the 4th Workshop on Workflows in Support of Large-Scale Science* (Portland, Oregon, Nov. 16-16, 2009). Works '09. ACM.

Böse, J., Andrzejak, A., and Högqvist, M. 2010. Beyond online aggregation: parallel and incremental data mining with online Map-Reduce. In *Proceedings of the 2010 Workshop on Massive Data Analytics on the Cloud* (Raleigh, North Carolina, Apr. 26-26, 2010). MDAC '10. ACM, New York, NY.

U. Kang, C. Tsourakakis, A.P. Appel, C. Faloutsos, and J. Leskovec. HADi: Fast Diameter Estimation and Mining in Massive Graphs with Hadoop. CMU ML Tech Report CMU-ML-08-117, 2008.

S. Das, and et al., Ricardo: Integrating R and Hadoop, ACM SIGMOD, 2010.

2001 Meta Report on Big Data; http://blogs.gartner.com/doug-laney/files/2012/01/ad949-3D-Data-Management-Controlling-Data-Volume-Velocity-and-Variety.pdf.

Computing Research Association Whitepaper; http://www.cra.org/ccc/files/docs/init/Big_Data.pdf.

AMD Whitepaper; http://sites.amd.com/us/Documents/Big_Data_Whitepaper.pdf.

MapReduce: Simplified Data Processing on Large Clusters; http://research.google.com/archive/mapreduce.html.

BigTable: A Distributed Storage System for Structured data; http://static.googleusercontent.com/external_content/untrusted_dlcp/research.google.com/en//archive/bigtable-osdi06.pdf.

New Analysis Prcatices for Big data; http://db.cs.berkeley.edu/jmh/papers/madskills-032009.pdf.

Comparison of approaches to large scale data analysis; http://database.cs.brown.edu/sigmod09/benchmarks-sigmod09.pdf.

Hadoop Documentation; http://hadoop.apache.org/.

ITIL Framework; www.itil-officialsite.com/.

PCT International Search Report dated Oct. 9, 2015.

* cited by examiner

BIG DATA CENTRALIZED INTELLIGENCE SYSTEM

TECHNICAL FIELD

The present invention relates to systems and methods for managing and maintaining large scale, connected information systems including servers, databases, mainframes, and other technological assets.

BACKGROUND OF THE INVENTION

System Administrators ("Administrators") at large corporations must support a vast array of technological assets, virtual and physical. Administrators are usually part of a simple operational hierarchy, sometimes based on the asset type they support. For example, server administrators maintain servers, while storage administrators support large memory devices.

System administration requires a significant number of human resources. Administrators focus much of their time resolving infrastructure incidents, implementing changes and requests. Resources are often wasted to locate causes of failure and to react to sudden and unexpected maintenance or execution problems. Unfortunately, many times these human assets are restricted by these reactive tasks. Administrators are not able to detect patterns between events or provide comprehensive solutions that would provide better ways of maintaining the connected infrastructure, either due to the reactive nature of work, or because they are limited by the human ability to make complex inferences from large data sets.

Furthermore, many big organizations maintain multiple and redundant data systems, which increases the complexity of data management. Further, over the last few years, there has been a rapid increase in the interconnectedness of devices and in the volume, velocity, and variety of data they produce. Administrators, therefore, find it increasingly difficult to effectively maintain their assets without understanding the complete picture of the technological asset landscape.

Currently, many organizations take a silo approach to managing and maintaining their technological assets. Administrators are divided into homogenous groups with similar objectives, usually by similar technologies or functions. The interconnections between these groups are usually limited and only increase on an ad hoc basis. Any co-relations made between events or concepts that apply to multiple groups are made by Administrators, not software or management systems. Such connections are usually limited to a localized level, and also limited by human ability.

While the architectural hierarchies of Administrator groups can remain the same, how the Administrators engage with the same data landscape has to evolve. A need exists for a suite of related analytical tools and techniques to create a single holistic picture of an increasingly connected environment.

BRIEF SUMMARY OF THE INVENTION

In one aspect of the invention, a computer-implemented centralized intelligence system is provided for managing, analyzing, and maintaining large scale, connected information systems. The system may include a computer memory storing a Big Data Engine for (a) generating historical analysis, real-time analysis, and forecast modeling regarding connected information systems; (b) automatically correcting errors and self-learning; and (c) creating a risk management profile. The system is linked to at least one connected information system and transmits and receives data from the at least one connected information system. The system includes a user interface for accepting and interpreting user input and providing information to the user regarding the at least one connected information system. The system also includes computer processing components for accessing the stored historical analysis, real-time analysis, forecast modeling, correction, and risk management programs and executing the programs to allow the user to perform managing, analyzing, and maintaining tasks through the user interface.

In an additional aspect of the invention, a computer-implemented centralized intelligence system method is provided for managing, analyzing, and maintaining large scale, connected information systems. The method may include storing a Big Data Engine in a computer memory, where the Big Data Engine (a) generates historical analysis, real-time analysis, and forecast modeling regarding connected information systems; (b) automatically corrects data; and (c) creates a risk management profile. The method also implements computer processing components for accessing the stored historical analysis, real-time analysis, forecast modeling, correction, and risk management programs and executing the programs to allow the user to perform managing, analyzing, and maintaining tasks through a user interface.

BRIEF DESCRIPTION OF DRAWINGS

The present invention will now be described, by way of example only, with reference to the accompanying Figures, in which.

The following describes in detail various embodiments of the present invention. One of ordinary skill in the art would understand that standard programming and engineering techniques may be used to produce such embodiments including software, firmware, hardware, or any combination thereof to implement the disclosed subject matter. The attached Figures depict exemplary embodiments and are meant to be understood in view of the details disclosed herein.

DETAILED DESCRIPTION OF PREFERRED EMBODIMENTS

Embodiments of the present invention are directed to a system and method for a centralized intelligence system ("CIS") that provides an integrated and holistic view of large scale, connected information systems including servers, databases, mainframes, and other technological assets.

Figure 1:
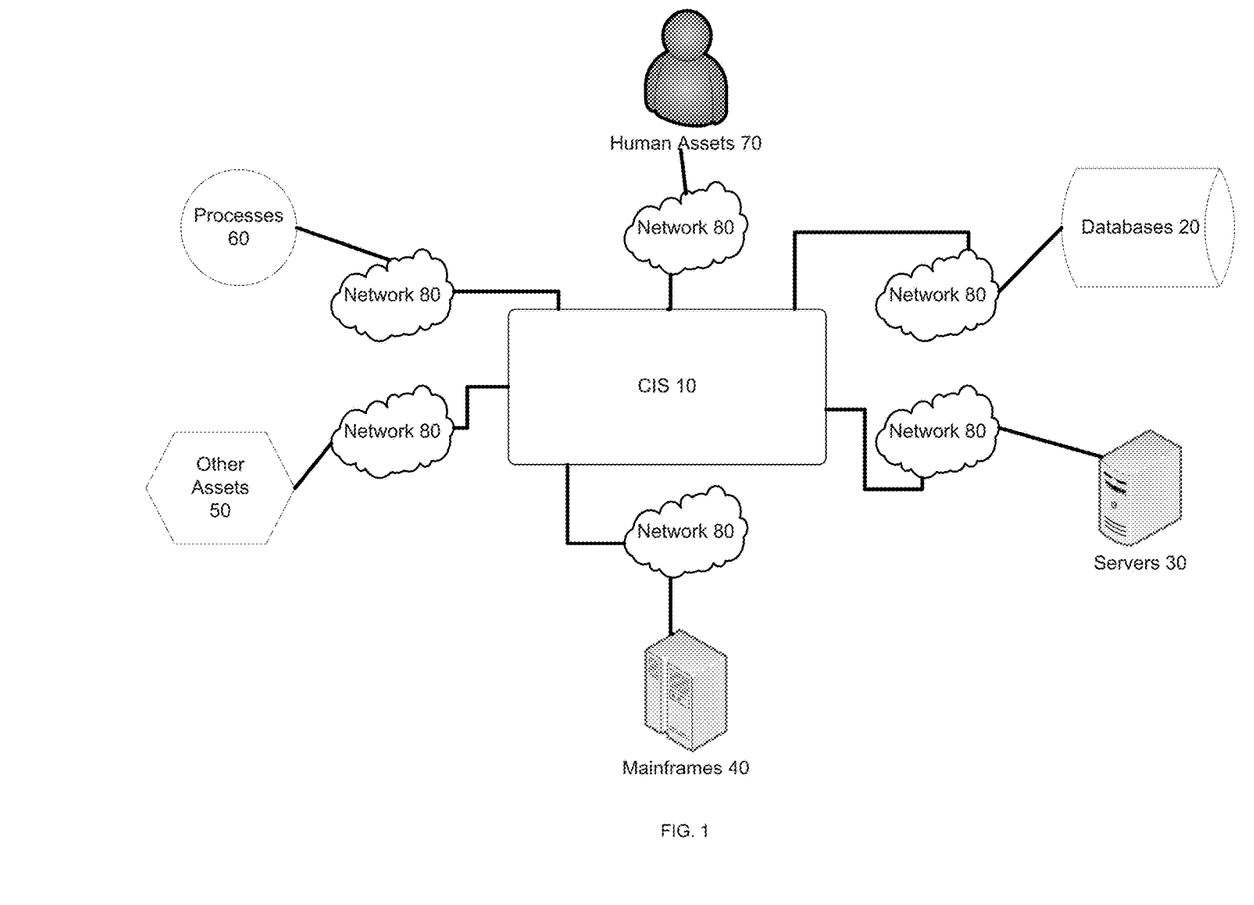
FIG. 1 is a block diagram illustrating an operating environment for a centralized intelligence system in accordance with an embodiment of the invention.

FIG. 1 is a block diagram illustrating an operating environment for the CIS 10 in accordance with an embodiment of the invention. The CIS is connected through a communications medium of a network 80 to one or more assets including databases 20, servers 30, mainframes 40, as well as other physical or virtual assets 50. The CIS can also be connected to other processes 60 that link the same or different assets. The CIS can also provide an interface with human assets 70. The CIS may be connected to the one or more assets to receive data feeds.

The network 80 is preferably a wired or wireless local area network (LAN), but may be or include other types of networks. For example, the network 80 may include the Internet, a wide area network (WAN), a wireless personal area network (PAN). When used in a LAN networking environment, computers and other technical assets may be connected to the LAN through a network interface or adapter. When used in a WAN networking environment, computers and other technical assets typically include a modem or other communication mechanism. Modems may be internal or external, and may be connected to the system bus via the user-input interface, or other appropriate mechanism. Computers and technical assets may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The databases 20 can include any structure for storing and organizing data. A database supports the definition, creation, querying, update, and administration of data. Well-known database management systems include Oracle, dBase, SQL, MySQL, Microsoft SQL Server, Microsoft Access, and IBM DB2. The servers 30 can include any system that responds to requests across a computer network or helps provide a network service. Typical servers include database servers, communications servers, mail servers, print servers, file servers, web servers, DNS servers, proxy servers, financial services servers, and gaming servers. The mainframes 40 can include any computer system for bulk data processing. Examples of mainframes include the IBM zEnterprise System models.

The other assets 50 can include any technical asset not covered by databases 20, servers 30, or mainframes 40. Such assets may include personal computers, laptops, ultrabooks, mobile devices, tablets, or any other computational devices. Other assets 50 may also include sensors or input/output devices like keyboards, mice, cameras, video cameras, microphones, telephones, iris scanners, fingerprint readers, key card readers, or any other device capable of creating data and/or transmitting a data stream.

The other processes 60 can include IT service management software that links technical assets like database incident management processes, data integration processes, knowledge management applications, infrastructure management tools, and other processes, software, and tools well known in the art. The other processes 60 may link to the same assets, some of the assets, or none of the assets that link to the CIS. The other processes 60 may connect to a plurality of different networks and more than one CIS.

The human assets 70 are preferably Administrators. Information regarding the Administrators activities including types of tasks done, time spent doing tasks, and for which assets can be valuable. The human assets 70 could also include any other users that interact with the technical assets linked to the CIS, such as subscribers, employees, patients, clients, or agents. Their usage information can be equally valuable.

In a preferred embodiment, the above described assets are linked to the CIS 10 such that they transmit data to the CIS 10 and receive data from the CIS 10. The CIS 10 may be facilitated through a computer implemented application. The application may run locally or be available over a network like the Internet or a local area network (LAN). The CIS 10 provides system users with an interactive experience in real time. The details of the CIS 10 are further described in connections with FIGS. 2-6.

Figure 2:
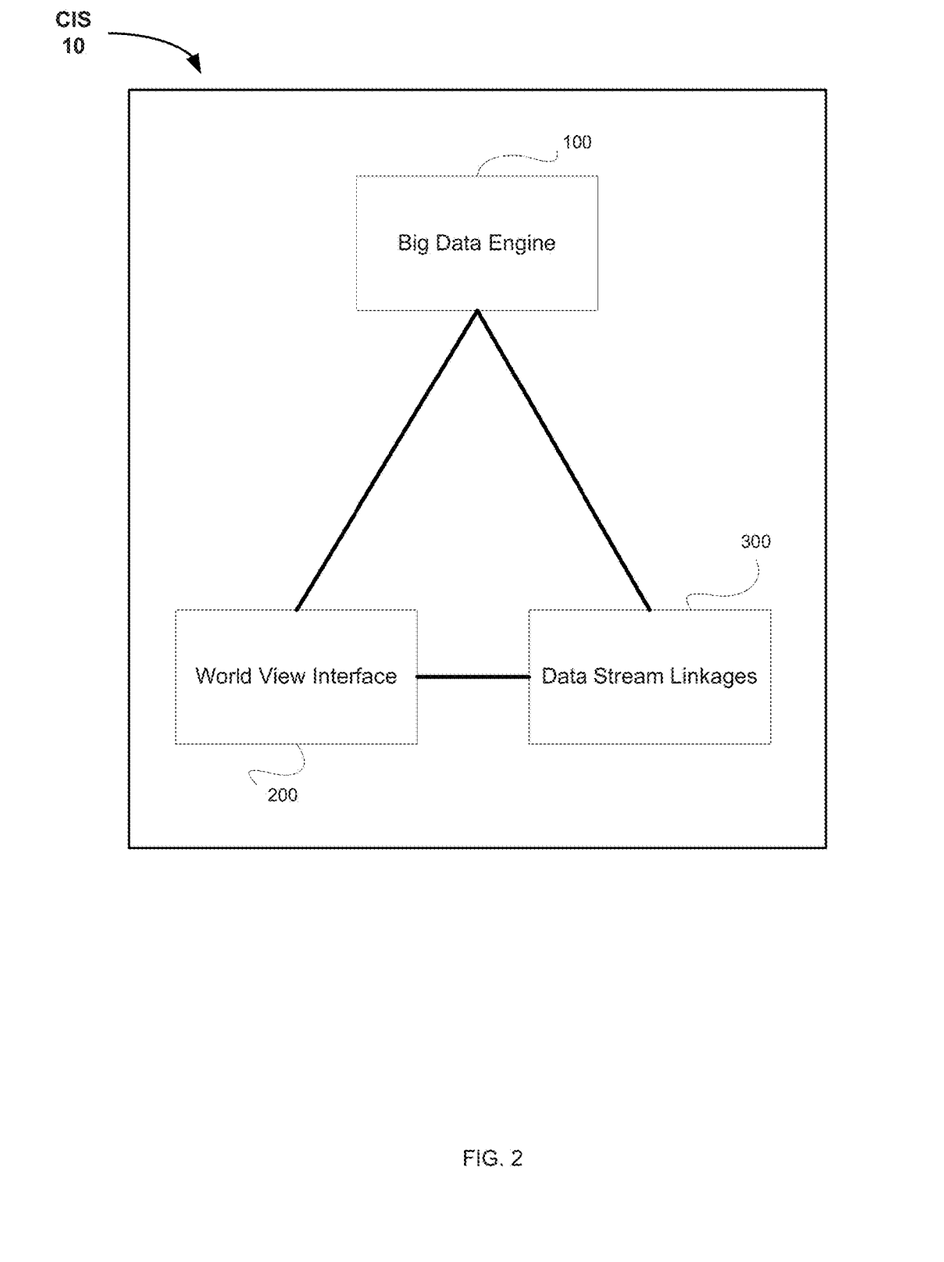
FIG. 2 is an exemplary embodiment illustrating various components of a centralized intelligence system and an exemplary process flow between the components.

FIG. 2 is an exemplary embodiment illustrating various components of a CIS system and an exemplary process flow between the components. The CIS 10 may include, for example, a Big Data Analytics Engine 100, World View Interface 200, and Data Stream Linkages 300. The Big Data Analytics Engine 100 drives the analysis of the data provided via the Data Stream Linkages 300. The World View Interface 200 provides a graphical user interface for a user to view and interact with the analyses provided by the Big Data Analytics Engine 100.

The Data Stream Linkages 300 may accept input and send output to the linked assets. As set forth in respect to FIG. 1, the linked assets may include databases 20, servers 30, mainframes 40, other physical or virtual assets 50, other processes 60, and human assets 70.

The World View Interface 200 operates as an interface between the CIS 10 and the user. It processes user input in order to provide the high-level management of the linked assets. In embodiments, the World View Interface 200 allows a user to interact with the linked assets and their data at all resolution levels. The input may take various forms and preferably includes tactile or touch input and voice input. The input may also be keyboard input, motion input, and for the purpose of security monitoring, may include retinal input or thumbprint input. The World View Interface 200 is operational to sense any input that may be provided from user interface tools on any devices connected to the CIS 10. As used herein, the World View Interface 200 may include any hardware, software, or combination of hardware and software used by a processing machine that allows a user to interact with the computer processor or processing machine.

In embodiments, the World View Interface 200 can also act as a virtual collaborator that assists Administrators with their daily tasks. The World View Interface 200 utilizes advances in speech recognition, natural language programming, and machine learning to interact with human actors. It can analyze data in real-time and assist in decision-making by providing a seamless and universal interactive experience for the Administrator. Thus, Administrators without analytical backgrounds can make sense of the data they administer.

Figure 3:
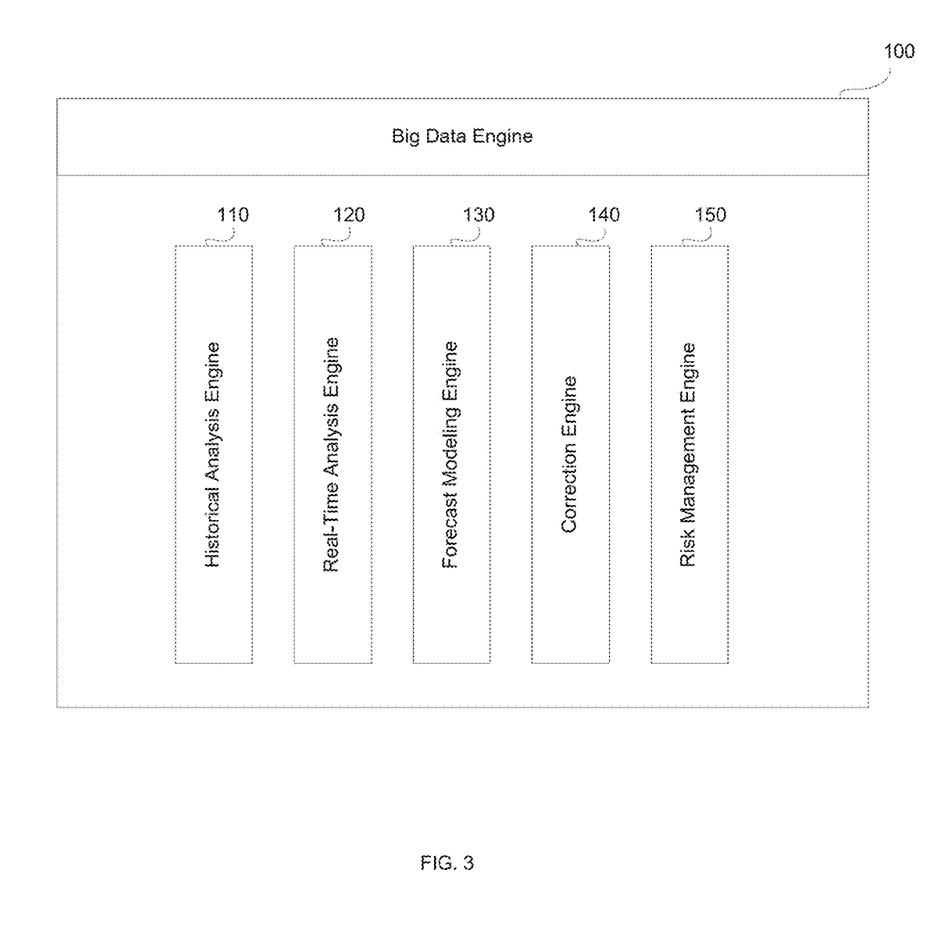
FIG. 3 is a block diagram illustrating various components of a Big Data Engine in accordance with an embodiment of the invention.

FIG. 3 is a block diagram illustrating various components of the Big Data Analytics Engine 100 in accordance with an embodiment of the invention. The Big Data Analytics Engine 100 may include, for example, a Historical Analysis Engine 110, Real-Time Analysis Engine 120, Forecast Modeling Engine 130, Correction Engine 140, and Risk Management Engine 150. It should be understood that although these components are shown as separate components communicating with one another, software components such as Historical Analysis Engine 110 may be stored by a computer memory and accessed and executed by a computer processor in operation. Parallel processing can be utilized to run the components at the same time. While the computer processing components and computer memory are not shown separately, their functionality is integrated with the components shown and they are fully described herein.

The Historical Analysis Engine 110 may provide information to a user through the World View Interface 200 regarding the historical performance of linked assets. For example, a user may input a query regarding the historical performance of a functional area that utilizes one or more of the assets connected to the CIS 10. The Historical Analysis Engine 110 can utilize machine learning algorithms, pattern detection algorithms, image recognition algorithms, and other algorithms to investigate large volumes of data and provide meaningful analysis. Using the Historical Analysis Engine 110, tasks such as root cause analysis could be fully automated. In a preferred embodiment, the Historical Analysis Engine 110 provides a historical performance report to the user via the World View Interface 200.

The Real-Time Analysis Engine 120 may provide information to a user through the World View Interface 200 regarding the real-time performance of linked assets. For example, a user may input a query regarding the real-time functionality of a certain line of business that utilizes one or more assets connected to the CIS 10. The Real-Time Analysis Engine 120 can utilize machine learning algorithms, pattern detection algorithms, image recognition algorithms, and other algorithms to provide meaningful information regarding a real-time infrastructure event. It may also call on the Historical Analysis Engine 110 to perform historical analysis regarding data related to a specific real-time event. In a preferred embodiment, the Real-Time Analysis Engine 120 can continuously provide up-to-date reports to the user via the World View Interface 200 for a given real-time event or events.

The Forecast Modeling Engine 130 may provide information to a user through the World View Interface 200 regarding a predicted performance of linked assets. For example, a user may input a query regarding the future functionality of certain assets connected to the CIS 10. The Forecast Modeling Engine 130 can utilize machine learning algorithms, pattern detection algorithms, image recognition algorithms, and other algorithms to provide a prediction regarding the performance of the specific assets. It may also call on the Historical Analysis Engine 110 to perform historical analysis regarding data related to certain assets or functions. In a preferred embodiment, the Forecast Modeling Engine 130 provides a predictive report to the user via the World View Interface 200.

An Administrator could review the one or more reports generated by the Historical Analysis Engine 110, the Real-Time Analysis Engine 120, and/or the Forecast Modeling Engine 130, to more effectively (1) fix a known problem; (2) react to a real-time infrastructure event; or (3) allocate resources to test future infrastructure changes. For example, Administrators may be upgrading one or more systems linked to the CIS 10. To understand where possible breaks may occur, the Administrators run the Historical Analysis Engine 110 to produce a report pinpointing possible source(s) of failure. Then they run the Forecast Modeling Engine 130 to predict, for example, how many human resources are needed to implement the change, how much time it will take, how other connected systems will be affected, and what changes are needed in the system infrastructure to effectively implement the upgrade. Once the upgrade commences, the Real-Time Analysis Engine 120 can be used to monitor the status of the upgrade and its effect on the other connected systems in real time.

Referring back to FIG. 3, the Correction Engine 140 may provide information to a user through the World View Interface 200 regarding proactive or reactive steps with respect to unwanted errors associated with certain assets. For example, the Correction Engine 140 may continuously monitor the data input to the CIS 10 via the Data Stream Linkages 300. The Correction Engine 140 can utilize, among other algorithms, machine learning algorithms, pattern detection algorithms, image recognition algorithms, and other algorithms to analyze the data and recognize correctable errors or unwanted deviations. It may also call on the Historical Analysis Engine 110, Real-Time Analysis Engine 120, and/or Forecast Modeling Engine 130 to perform specialized analysis of the data. In a preferred embodiment, the Correction Engine 140 employs an intelligent automated mechanism for pro-active correction of an error as it originates and/or for minimum reactive action after the error is identified. In another embodiment, the Correction Engine 140 curates an infrastructure with no human involvement, reducing both human cost of capital and possibility of human error.

The Risk Management Engine 150 may provide information to a user through the World View Interface 200 regarding models for risk management based on planned and un-planned future events with real-life constraints. For example, the Risk Management Engine 150 may interface with a database storing regulatory provisions via the Data Stream Linkages 300. The Risk Management Engine 150 can utilize, among other algorithms, machine learning algorithms, pattern detection algorithms, image recognition algorithms, and other algorithms to analyze the regulatory provisions. It may also call on the Historical Analysis Engine 110, Real-Time Analysis Engine 120, and/or Forecast Modeling Engine 130 to perform specialized analysis of the linked assets' data and the regulatory provisions. In a preferred embodiment, the Risk Management Engine 150 produces a risk management profile report to the user via the World View Interface 200. In another preferred embodiment, the Risk Management Engine 150 can interact with the Correction Engine 140 to flag or even pro-actively correct deviations deemed to be high risk.

Figure 4A:
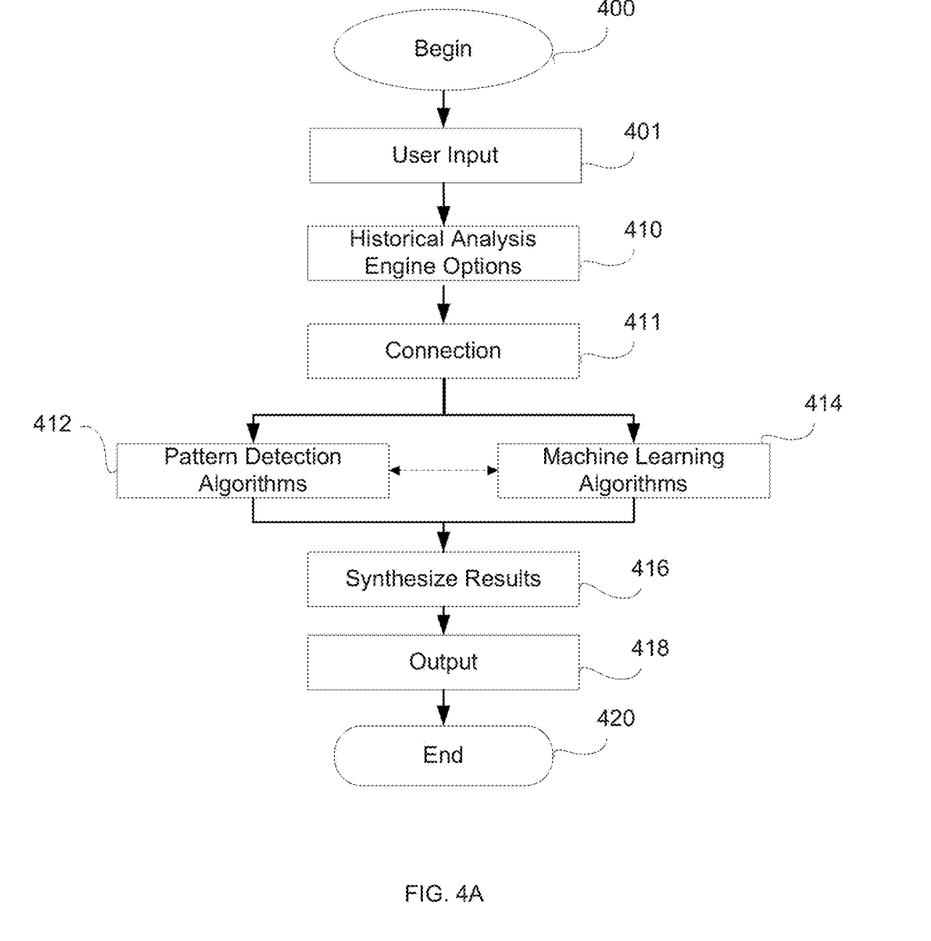
FIG. 4A is an exemplary embodiment illustrating a user initiated reporting method associated with the Historical Analysis Engine.
Figure 4B:
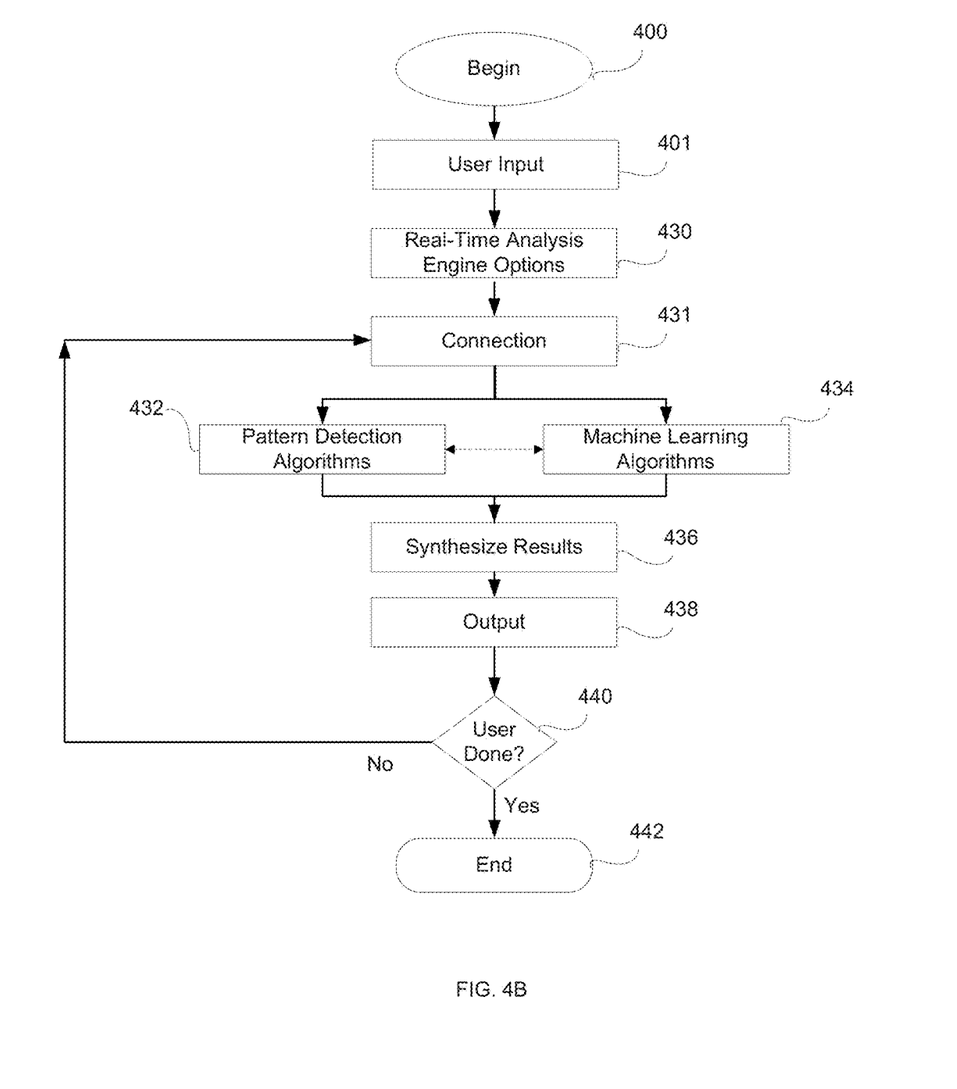
FIG. 4B is an exemplary embodiment illustrating a user initiated reporting method associated with the Real-Time Analysis Engine.
Figure 4C:
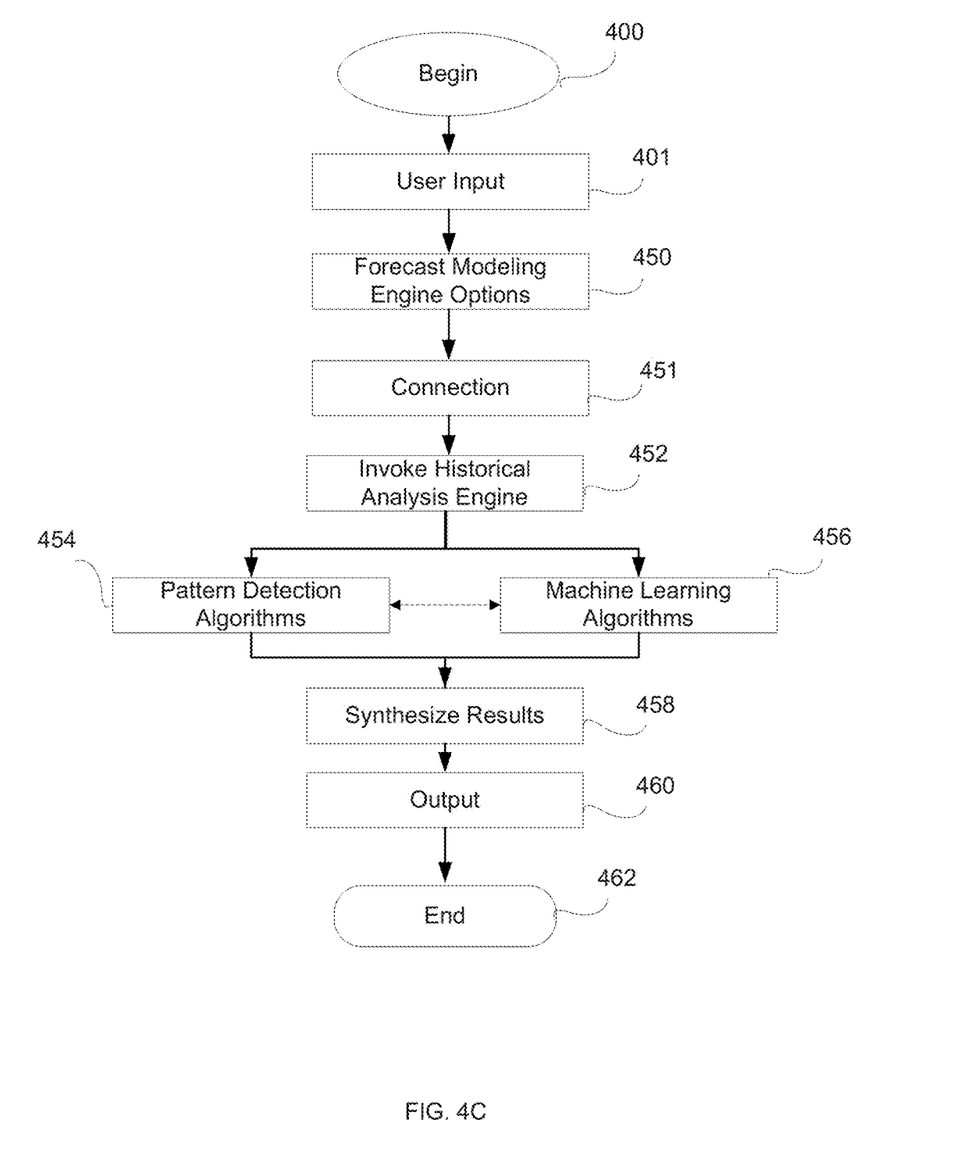
FIG. 4C is an exemplary embodiment illustrating a user initiated reporting method associated with the Forecast Modeling Engine.

FIGS. 4A-4C are flow charts illustrating user initiated reporting methods associated with the Historical Analysis Engine 110, Real-Time Analysis Engine 120, and/or Forecast Modeling Engine 130. All three methods begin in step 400 and the World View Interface 200 provides the user with an option to run a historical analysis report, real-time analysis report, or forecast modeling report in step 401.

As illustrated in FIG. 4A, if the user selects a historical analysis report, the Historical Analysis Engine 110, via the World View Interface 200 in step 410, provides the user with options regarding the historical analysis to be conducted. The options may include which linked assets are involved, assets and/or data associated with a functional area, assets and/or data associated with a line of business, assets and/or data associated with a particular event, etc. The Historical Analysis Engine 110 connects with the selected assets in step 411. In step 412, pattern detection algorithms are implemented on the selected data. In step 414, machine learning algorithms are implemented on the selected data. As can be seen in the illustration, the pattern detection algorithms and machine learning algorithms can be run at the same time and share information. The processes can run in serial or parallel on a single processor, multiple processors, or a distributed computational system. The output of the algorithms is synthesized in step 416. A report is generated to be output to the user via the World View Interface 200 in step 418. The reports can provide interactive visual displays of related, normalized data in a meaningful and accessible format. The method ends in step 420.

As illustrated in FIG. 4B, if the user selects a real-time analysis report in step 401, the Real-Time Analysis Engine 120, via the World View Interface 200 in step 430, provides the user with options regarding the real-time analysis to be conducted. The options may include which linked assets are involved, assets and/or data associated with a functional area, assets and/or data associated with a line of business, assets and/or data associated with a particular real-time event, etc. The Real-Time Analysis Engine 120 connects with the selected assets in step 431. In step 432, pattern detection algorithms are implemented on the selected data. In step 434, machine learning algorithms are implemented on the selected data. As can be seen in the illustration, the pattern detection algorithms and machine learning algorithms can be run at the same time and share information. The processes can run in serial or parallel on a single processor, multiple processors, or a distributed computational system. The output of the algorithms is synthesized in step 436. A report is generated to be output to the user via the World View Interface 200 in step 438. The user is prompted if the real-time analysis should be terminated in step 440. If the user selects no, the Real-Time Analysis Engine 120 loops back to step 431. In embodiments, the user is not notified every time the method reaches step 440, rather he is able to input his preference that the real-time analysis should terminate and this input is recognized anytime step 440 is reached. In this way, the real-time analysis report is continuously updated until the user terminates the process. The reports can provide real-time interactive visual displays of related, normalized data in a meaningful and accessible format. The method ends at step 442.

As illustrated in FIG. 4C, if the user selects a forecast modeling report in step 401, the Forecast Modeling Engine 130, via the World View Interface 200 in step 450, provides the user with options regarding the predictive analysis to be conducted. The options may include which linked assets are involved, assets and/or data associated with a functional area, assets and/or data associated with a line of business, assets and/or data associated with a particular event, etc. Other options may include hypothetical criteria, where the user may input a number of variables at different resolution levels. The Forecast Modeling Engine 130 connects with the selected assets in step 451. In step 452, the Historical Analysis Engine 110 is invoked and relevant information is automatically supplied to the method. In step 454 pattern detection algorithms are implemented on the selected data and/or variables supplied by the user. In step 456, machine learning algorithms are implemented on the selected data and/or variables. As can be seen in the illustration, the pattern detection algorithms and machine learning algorithms can be run at the same time and share information. The processes can run in serial or parallel on a single processor, multiple processors, or a distributed computational system. In step 458, the output of the algorithms is synthesized with the information generated by Historical Analysis Engine. A report is generated to be output to the user via the World View Interface 200 in step 460. The reports can provide predictions in interactive visual displays of related, normalized data in a meaningful and accessible format. The method ends at step 462.

Figure 5:
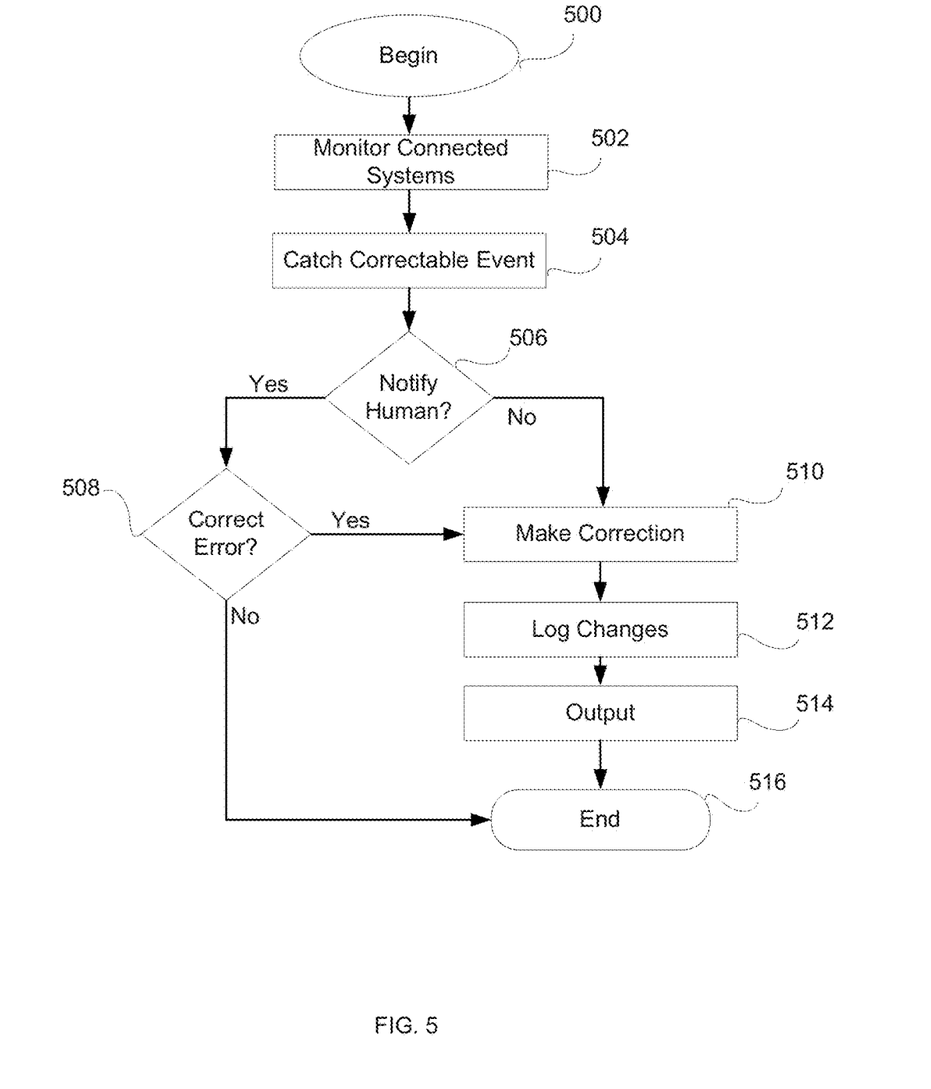
FIG. 5 is an exemplary embodiment illustrating an automatic correcting method associated with the Correction Engine.

FIG. 5 is a flow chart illustrating an automatic correcting method associated with the Correction Engine 140. The method begins at step 500 and automatically the Correction Engine 140 continuously monitors connected assets in step 502. At step 504, the Correction Engine 140 detects a correctable error/deviation. In step 506, the Correction Engine 140 determines whether the error requires the attention of an Administrator. In step 508, it notifies an Administrator via the World View Interface 200 that an error has been detected. It then can ask whether the error should be automatically corrected. If yes, the Correction Engine 140 makes the correction in step 510 and logs the change in step 512. If the error does not require human intervention, the Correction Engine 410 can proceed from step 506 to step 510 to automatically correct the error. A report can be generated in step 514 that compiles change logs for output via the World View Interface 200. The method ends in step 516.

Figure 6:
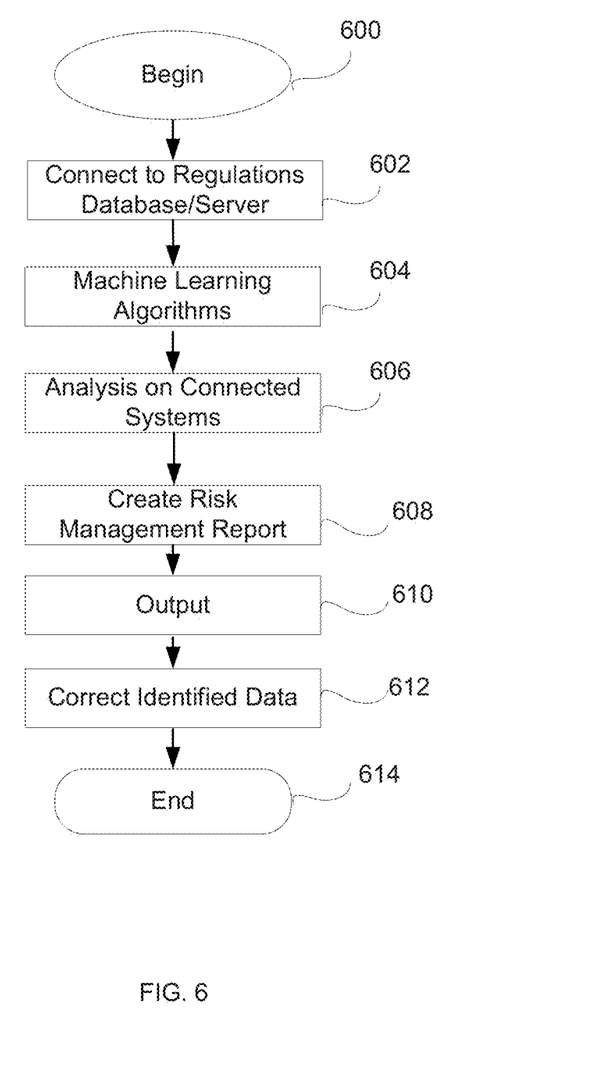
FIG. 6 is an exemplary embodiment illustrating a risk management method associated with the Risk Management Engine.

FIG. 6 is a flow chart illustrating a risk management method associated with the Risk Management Engine 150. The method begins in step 600 and automatically the Risk Management Engine 150 connects to a regulations database/server asset in step 602. In step 604 it utilizes a machine learning algorithm to create a regulatory framework applicable to the relevant data owned by assets linked to CIS 10 via Data Stream Linkages 300. In step 606 the Risk Management Engine 150 runs an analysis on the linked assets' data in relation to the regulatory framework. In step 608, it creates a risk management report and outputs it to a user via the World View Interface 200 in step 610. In optional step 612, the Risk Management Engine 150 calls the Correction Engine 140 to automatically correct identified data that does not conform with the risk management report. The method ends in step 614.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

As described above, embodiments of the system and processes of the invention are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows Vista operating system, the Microsoft Windows XP operating system, the Microsoft Windows NT operating system, the Microsoft Windows 2000 operating system, the Microsoft Windows 7 operating system, the Microsoft Windows 8 operating system, the Unix operating system, the Linux operating system, the Xenix operating system, the IBM AIX operating system, the Hewlett-Packard UX operating system, the Novell Netware operating system, the Sun Microsystems Solaris operating system, the OS/2 operating system, the BeOS operating system, the Apple Macintosh OS X operating system, the Apache operating system, an OpenStep operating system, the Apple iOS operating system, the Google Android operating system, or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression, hashing, or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A centralized intelligence computing system for the centralized administration of multiple connected information systems, the centralized intelligence computing system comprising:
   a computer memory storing instructions including a big data engine, the big data engine including a historical analysis engine, a real time analysis engine, a forecast modeling engine, a correction engine, and a risk management engine;
   at least one data link, wherein the data link transmits and receives data from the multiple connected information systems;
   a world view interface for allowing a user to interact with the centralized intelligence computing system to provide management of the connected information systems;
   at least one computer processor executing the stored instructions to perform steps including:
      providing an interactive user interface through the world view interface including selectable options for activating the historical analysis engine, the real time analysis engine, the forecast modeling engine, the correction engine, and the risk management engine;
      interfacing with a database storing regulatory provisions via the at least one data link upon selection of the risk management engine;
      utilizing a machine learning algorithm to create a regulatory framework from the regulatory provisions, the regulatory framework applicable to the data from the multiple connected information systems;
      analyzing data stored in at least one of the connected information systems and received over the at least one data link based on the applicable regulatory framework created using the machine learning algorithm;
      performing a risk management assessment utilizing the risk management engine and interacting with the correction engine using an algorithm performing error detection for detecting at least one error;
      generating a report including a risk management profile report based on the analyzed data;
      outputting the report to a user via the world view interface;
      determining, based on the risk management profile report and the correction engine analysis whether the data conforms with the risk management profile report; and
      automatically correcting the data containing the at least one error associated with the at least one connected information system when the data fails to conform with the risk management profile report, wherein the system performs parallel processing in order to operate the historical analysis engine, the real time analysis engine, the forecast modeling engine, the correction engine, and the risk management engine simultaneously.

2. The system of claim 1, wherein the step of analyzing includes performing at least one of historical analysis, real-time analysis, and forecast modeling.

3. The system of claim 2, wherein the steps of generating a report and outputting the report are performed continuously.

4. The system of claim 2, wherein the step of analyzing implements machine learning and pattern detection algorithms.

5. The system of claim 1, wherein the step of automatically correcting data includes notifying a user that an error has been detected.

6. The system of claim 1, wherein the step of automatically correcting data utilizes machine learning and pattern detection algorithms.

7. The system of claim 1, wherein the step of creating a risk management profile report includes utilizing machine learning algorithms to produce a risk management profile.

8. The system of claim 7, wherein the step of creating a risk management profile includes automatically correcting data identified by the risk management profile.

9. A computer-implemented method for the centralized administration of multiple connected information systems by a single centralized intelligence computing system, the method comprising:
   storing instructions in at least one computer memory, the instructions including a big data engine, the big data engine including a historical analysis engine, a real time analysis engine, a forecast modeling engine, a correction engine, and a risk management engine; and
   implementing at least one computer processor for accessing the stored instructions in the computer and executing the instructions to perform steps including:
      providing an interactive user interface through a world view interface including selectable options for activating the historical analysis engine, the real time analysis engine, the forecast modeling engine, the correction engine, and the risk management engine;
      interfacing with a database storing regulatory provisions via at least one data link upon selection of the risk management engine;
      connecting with the multiple connected information systems utilizing at least one data link;
      utilizing a machine learning algorithm to create a regulatory framework based on the stored regulatory provisions, the regulatory framework applicable to the data from the multiple connected information systems;
      analyzing data stored in at least one of the multiple connected information systems and received over the at least one data link, based on the applicable regulatory framework created using the machine learning algorithm;
      performing a risk management assessment utilizing the risk management engine and interacting with the correction engine using an algorithm performing error detection for detecting at least one error generating a report including a risk management profile report based on the analyzed data;
      outputting the report to a user through the world view interface;
      determining, based on the risk management profile report and the correction engine analysis whether the data conforms with the risk management profile report; and
      automatically correcting the data containing the at least one error associated with the at least one connected information system when the data fails to conform with the risk management profile report, wherein the system performs parallel processing in order to operate the historical analysis engine, the real time analysis engine, the forecast modeling engine, the correction engine, and the risk management engine simultaneously.

10. The method of claim 9, wherein the step of analyzing includes performing at least one of historical analysis, real-time analysis, and forecast modeling.

11. The method of claim 10, wherein the steps of generating a report and outputting the report are performed continuously.

12. The method of claim 10, wherein the step of analyzing implements machine learning and pattern detection algorithms.

13. The method of claim 9, wherein the step of automatically correcting data includes notifying a user that an error has been detected.

14. The method of claim 9, wherein the step of automatically correcting data utilizes machine learning and pattern detection algorithms.

15. The method of claim 9, wherein the step of creating a risk management profile report includes utilizing machine learning algorithms to produce a risk management profile.

16. The method of claim 15, wherein the step of creating a risk management profile includes automatically correcting data identified by the risk management profile.

17. A centralized intelligence computing system for the centralized administration of multiple connected information systems, the centralized intelligence computing system comprising:
   a computer memory storing instructions including a big data engine, the big data engine including a historical analysis engine, a real time analysis engine, a forecast modeling engine, a correction engine, and a risk management engine;
   at least one data link, wherein the data link transmits and receives data from the one connected information systems;
   a world view interface for allowing a user to interact with the centralized intelligence computing system to provide management of the connected information systems;
   at least one computer processor executing the stored instructions of the big data engine to perform steps including:
      providing an interactive user interface through the world view interface including selectable options for activating the historical analysis engine, the real time analysis engine, the forecast modeling engine, the correction engine, and the risk management engine;
      interfacing with a database storing regulatory provisions via at last one data link upon selection of the risk management engine;
      analyzing data stored in at least one of the connected information systems by performing at least one of historical analysis, real-time analysis, and forecast modeling using machine learning and pattern detection algorithms;

utilizing a machine learning algorithm to create a regulatory framework based on the regulatory provisions in the database, the regulatory framework applicable to data from the connected information systems;

analyzing the data stored in at least one of the connected information systems and received over the at least one data link based on the applicable regulatory framework created using the machine learning algorithm;

performing a risk management assessment utilizing the risk management engine and interacting with the correction engine using an algorithm performing error detection for detecting at least one error;

creating a risk management profile;

generating a report including a risk management profile report based on the analyzed data;

outputting the report to a user via the world view interface;

determining, based on the risk management profile report and the correction engine analysis whether the data conforms with the risk management profile report; and automatically correcting the data containing the at least one error when the data fails to conform with the risk management profile report, by utilizing machine learning and pattern detection algorithms, the corrected data including data identified by the risk management profile, wherein the system performs parallel processing in order to operate the historical analysis engine, the real time analysis engine, the forecast modeling engine, the correction engine, and the risk management engine simultaneously.

18. A computer-implemented method for the centralized administration of multiple connected information systems by a single centralized intelligence computing system, the method comprising:

storing instructions in at least one computer memory, the instructions including a big data engine, the big data engine including a historical analysis engine, a real time analysis engine, a forecast modeling engine, a correction engine, and a risk management engine; and implementing at least one computer processor for accessing the stored instructions in the computer and executing the instructions to perform steps including:

providing an interactive user interface through a world view interface including selectable options for activating the historical analysis engine, the real time analysis engine, the forecast modeling engine, the correction engine, and the risk management engine;

interfacing with a database storing regulatory provisions via at least one data link upon selection of the risk management engine;

connecting with the multiple connected information systems utilizing at least one data link;

utilizing a machine learning algorithm to create a regulatory framework based on the regulatory provisions in the database, the regulatory framework applicable to data from the connected information systems;

analyzing data stored in at least one of the multiple connected information systems and received over the at least one data link by performing at least one of historical analysis, real-time analysis, and forecast modeling using machine learning and pattern detection algorithms;

analyzing data stored in at least one of the multiple connected information systems based on the applicable regulatory framework created using the machine learning algorithm;

performing a risk management assessment utilizing the risk management engine and interacting with the correction engine using an algorithm performing error detection for detecting at least one error;

creating a risk management profile;

generating a report including a risk management profile report based on the analyzed data;

outputting the report to a user through the world view interface;

determining, based on the risk management profile report and the correction engine analysis whether the data conforms with the risk management profile report; and automatically correcting the data associated with the at least one connected information system containing the at least one error when the data fails to conform with the risk management profile report by utilizing machine learning and pattern detection algorithms, the corrected data including data identified by the risk management profile, wherein the system performs parallel processing in order to operate the historical analysis engine, the real time analysis engine, the forecast modeling engine, the correction engine, and the risk management engine simultaneously.

* * * * *